US012050199B1

(12) United States Patent
Funchess et al.

(10) Patent No.: US 12,050,199 B1
(45) Date of Patent: Jul. 30, 2024

(54) GLASS BREAK DETECTION USING ULTRASONIC SIGNAL(S)

(71) Applicant: The ADT Security Corporation, Boca Raton, FL (US)

(72) Inventors: Gregory Lee Funchess, Houston, TX (US); Adam Gilbert Horn, Pine, CO (US); Bibek Khatakho, Dallas, TX (US); Jason Mikel Harris, Thorton, CO (US); Ryan Nathaniel Burnside, Great Falls, MT (US); Stephen Charles Kalapati, Parker, CO (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

(21) Appl. No.: 18/392,784

(22) Filed: Dec. 21, 2023

(51) Int. Cl.
*G01N 29/04* (2006.01)
*G08B 13/04* (2006.01)
*G08B 13/16* (2006.01)
*G08B 29/10* (2006.01)

(52) U.S. Cl.
CPC ............ *G01N 29/04* (2013.01); *G08B 13/04* (2013.01); *G08B 13/1672* (2013.01); *G01N 2291/0232* (2013.01); *G01N 2291/0289* (2013.01); *G08B 29/10* (2013.01)

(58) Field of Classification Search
CPC ................ G08B 13/04; G08B 13/1672; G08B 13/19663; G08B 13/19682; G08B 13/1663; G08B 13/1681; G08B 29/14; G08B 29/22
See application file for complete search history.

(56) References Cited

U.S. PATENT DOCUMENTS

| 5,323,141 A | 6/1994 | Petek |
| 5,510,767 A | 4/1996 | Smith |
| 5,515,029 A * | 5/1996 | Zhevelev ............... G08B 13/04 340/544 |
| 2009/0073803 A1* | 3/2009 | Smith ..................... G08B 29/22 367/13 |

(Continued)

FOREIGN PATENT DOCUMENTS

WO          9316449          8/1993

OTHER PUBLICATIONS

GS930 Acoustic Glass Break Detector Installation Sheet; Aritech; Carrier; Dec. 14, 2020, consisting of 16-pages.

(Continued)

*Primary Examiner* — Helen C Kwok
(74) *Attorney, Agent, or Firm* — Weisberg I.P. Law, P.A.

(57) ABSTRACT

Methods and apparatuses are described herein. In an example embodiment, a glass-break detector is provided. Glass-break detector includes a speaker and a microphone in sound communication with the glass and is configured to perform an echo signature procedure to generate a baseline echo signature. The echo signature procedure includes: causing the speaker to transmit an ultrasonic signal onto the surface of the glass, causing the microphone to measure sound wave amplitudes on the surface of the glass, and generating an echo signature based on the sound wave amplitudes. Glass-break detector is configured to repeat the echo signature procedure to generate a test echo signature and detect a break in the glass based at least on the baseline echo signature and the test echo signature.

20 Claims, 6 Drawing Sheets

(56) References Cited

U.S. PATENT DOCUMENTS

| | | | | |
|---|---|---|---|---|
| 2013/0170323 A1* | 7/2013 | Smith | .................... | G08B 13/04 |
| | | | | 367/197 |
| 2015/0194036 A1* | 7/2015 | Zhevelev | ............... | H04R 29/00 |
| | | | | 340/540 |
| 2016/0044394 A1* | 2/2016 | Derom | .................... | G01S 15/04 |
| | | | | 367/95 |
| 2017/0008491 A1 | 1/2017 | Bunting | | |
| 2018/0302730 A1* | 10/2018 | Liu | ........................ | H04R 29/00 |
| 2021/0264753 A1* | 8/2021 | Mansfield | .............. | G08B 29/14 |
| 2022/0270453 A1* | 8/2022 | Werner | .................. | G08B 13/04 |
| 2023/0055880 A1* | 2/2023 | Kornbluth | .......... | G01N 29/4454 |

OTHER PUBLICATIONS

Glass Break Sensor GS-2000E; Security Sensor; Takex-Takenaka Engineering Co., Ltd. 2000, consisting of 2-pages.
GS930 Acoustic Glassbreak Detector-3x3 Technology; Aritech; Carrier, May 5, 2023, consisting of 2-pages.
Takex Glass Break Sensor GS-2000E Instruction Manual; Takenaka Engineering Co., Ltd.; 2000, consisting of 8-pages.

\* cited by examiner

GLASS BREAK DETECTION USING ULTRASONIC SIGNAL(S)

TECHNICAL FIELD

The present technology is generally related to glass break detection.

BACKGROUND

Some premises monitoring systems, such as home or business alarm systems that monitor for intrusions, smoke, carbon monoxide, etc., include glass break sensors. Existing approaches for detecting the breakage of glass are based on listening for the sound of glass shattering or detecting a physical blow to the glass (e.g., from being struck or kicked).

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

Figure 1:
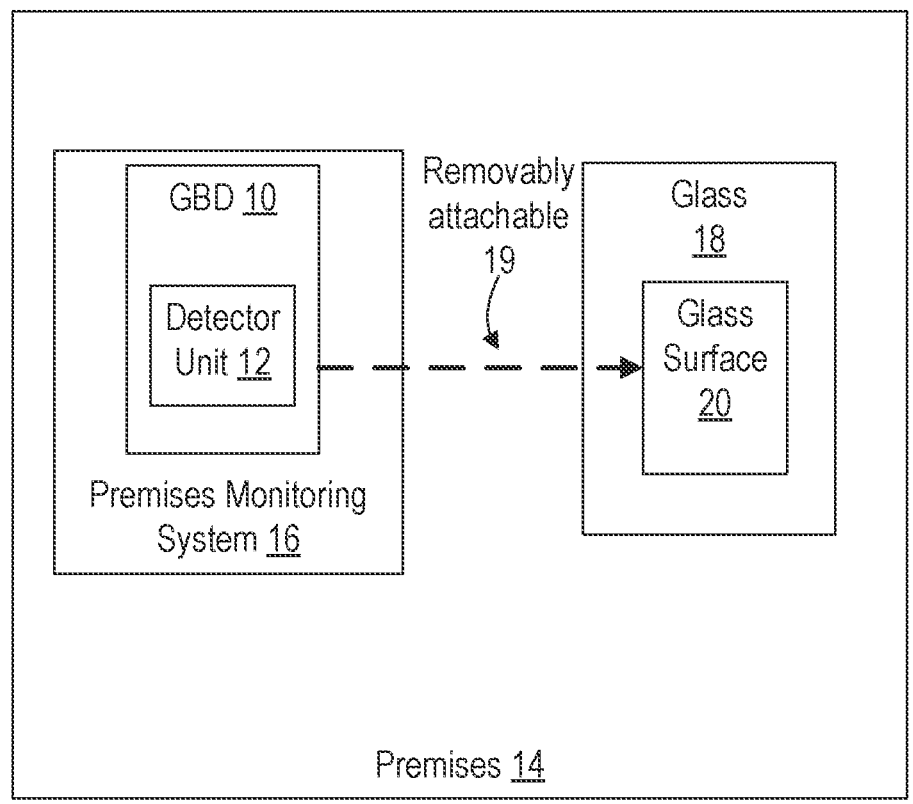
FIG. 1 is a schematic diagram of an example glass-break detector according to some embodiments of the present disclosure.

With reference to FIG. 1, shown is a schematic diagram of an example glass-break detector 10. The glass-break detector 10 may be located on a premises 14 associated with, e.g., a dwelling or other structure. The premises 14 may include a premises monitoring system 16 as described herein. A piece of glass 18 is present at the premises 14 and may be part of the dwelling or other structure, e.g., as part of a window or door. The glass-break detector 10 is removably attached to the surface 20 of the glass 18 (as indicated by reference numeral 19), such as but not limited to a portion of the surface 20 of the glass 18 adjacent an edge, and the surface 20 may face an exterior or an interior of the dwelling or other structure. The glass-break detector 10 is configured to include a detector unit 12, where detector unit 12 is configured to perform one or more glass-break detector 10 functions described herein, including functions related to glass break detection using ultrasonic signal(s), such as ultrasonic sound waves and/or ultrasonic vibrations. Glass breaks detected by various embodiments of the glass-break detector 10 include damage to the structure of the glass, including but not limited to shattering, cracking, or cuts in the glass, which may be indicative of or associated with an attempt by an intruder to gain entry to the dwelling or other structure.

According to one or more embodiments, the glass-break detector 10 may be part of a premises monitoring system 16. For example, the glass-break detector 10 may be configured to communicate, such as via a wired and/or wireless connection, with one or more components of the premises monitoring system 16. Premises monitoring system 16 may be configured to provide functionality relating to premises monitoring. For example, premises monitoring system 16 may be used to detect burglaries, smoke, fires, carbon monoxide leaks, water leaks, etc., and report detected events to a remote monitoring system (not shown in FIG. 1). Additionally, the premises monitoring functionality performed by premises monitoring system 16 may include home automation functionality. Examples of home automation functionality include thermostat control, door lock control, lighting control, appliance control, entertainment system control, etc.

Premises monitoring system 16 may comprise a control device (not shown in FIG. 1) that may be configured to control various aspects of premises monitoring system 16. For example, the control device may be configured to control premises devices (not shown in FIG. 1), such as locks, doors, windows, actuators, valves, motors, and any other controllable devices associated with premises monitoring system 16. Control device may include a user interface, such as buttons, a touch screen, a display, a microphone, a speaker, and/or other types of user interface components, to facilitate a user interacting with and controlling premises monitoring system 16.

Figure 2:
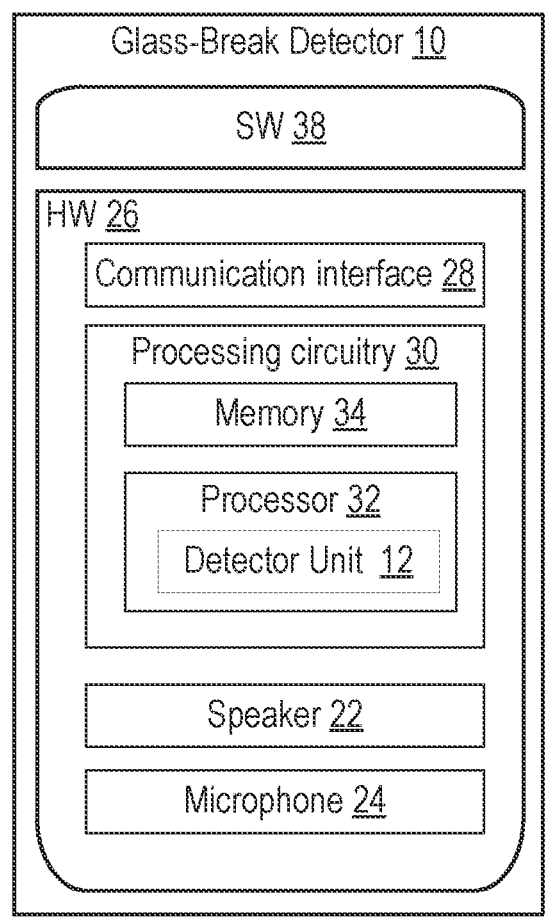
FIG. 2 is a block diagram of the example glass-break detector of FIG. 1 according to some embodiments of the present disclosure.

FIG. 2 is a diagram of an example glass-break detector 10 according to various embodiments of the present disclosure. As shown, glass-break detector 10 comprises hardware 26. Hardware 26 may include a communication interface 28 configured to support wired and/or wireless communication between glass-break detector 10 and, e.g., one or more components of the premises monitoring system 16, such as through WI-FI, BLUETOOTH, ZIGBEE, USB, Serial, Inter-Integrated Circuit (I2C), Ethernet, etc. protocols.

The hardware 26 may further include processing circuitry 30. The processing circuitry 30 may include one or more processors 32 and one or more memories 34. Each processor 32 may include and/or be associated with one or more central processing units, data buses, buffers, and interfaces to facilitate operation. In addition to or instead of a processor 32 and memory 34, the processing circuitry 30 may comprise other types of integrated circuitry that perform various functionality. Integrated circuitry may include one or more processors 32, processor cores, field programmable gate arrays (FPGAs), application specific integrated circuits (ASICs), graphics processing units (GPUs), Systems on Chips (SoCs), or other components configured to execute instructions. The processor 32 may be configured to access (e.g., write to and/or read from) the memory 34, which may comprise any kind of volatile and/or nonvolatile memory, e.g., cache, buffer memory, random access memory (RAM), read-only memory (ROM), optical memory, and/or erasable programmable read-only memory (EPROM). Further, the memory 34 may be embodied in the form of one or more storage devices. The processing circuitry 30 may be configured to perform various functionality described herein. For example, computer instructions may be stored in memory 34 and/or another computer-readable medium that, when executed by the processor 32, causes the processor 32 to perform various functionality described herein.

Hardware 26 of glass-break detector 10 may further comprise a speaker 22 (e.g., ultrasonic transmitter) configured for generating and emitting one or more ultrasonic signal(s), such as ultrasonic sound wave(s) or ultrasonic vibration(s). When the glass-break detector 10 is attached to the surface 20 of the glass 18, the speaker 22 is in sound communication with the surface 20 and may transmit an ultrasonic vibration in the form of an ultrasonic signal into the surface 20. The ultrasonic signal may be at a frequency of, e.g., approximately 40,000 Hz and, therefore, may not be within the range of hearing of occupants at the premises 14. The ultrasonic signal travels through the glass 18 and may be reflected by the edges of the glass as "echoes" that are detected by glass-break detector 10 as described herein. Hardware 26 of glass-break detector 10 may further comprise a microphone 24 (e.g., ultrasonic receiver) configured to listen for the echoes and/or receive ultrasonic sound waves associated with echoes. When the glass-break detector 10 is attached to the surface 20 of the glass 18, the microphone 24 is in sound communication with the surface 20. The time between transmission of an ultrasonic signal and the detection of the resultant echo may depend on one or more factors including but not limited to the material properties of the particular piece of glass 18, the physical dimensions (including, e.g., the geometry) of the glass 18, and the location of the glass-break detector 10 on the surface. A glass break may result in a change to one or more of these glass properties, such as changing the geometry by removing portions of the glass or creating cracks or cuts in the glass, resulting in the glass-break detector 10 detecting an echo at a different time than expected, thereby detecting a change to the glass 18, such as one indicative of a glass break.

Glass-break detector 10 may further comprise software 38 (which may include one or more software applications) stored internally in, for example, memory 34, or stored in external memory (e.g., database, storage array, network storage devices, etc.) accessible by the glass-break detector 10 via an external connection. Software 38 may include any software or program that configures processing circuitry 30 to perform the steps or processes of the present disclosure.

The processing circuitry 30 may be configured to control any of the methods and/or processes described herein and/or to cause such methods, and/or processes to be performed, e.g., by glass-break detector 10. Processor 32 corresponds to one or more processors 32 for performing glass-break detector 10 functions described herein. The memory 34 is configured to store data, programmatic software code and/or other information described herein. In some embodiments, the software 38 may include instructions that, when executed by the processor 32 and/or processing circuitry 30, causes the processor 32 and/or processing circuitry 30 to perform the processes described herein with respect to glass-break detector 10. Accordingly, by having computer instructions stored in memory 34 accessible to the processor 32, the processor 32 may be configured to perform the actions described herein.

Figure 3A:
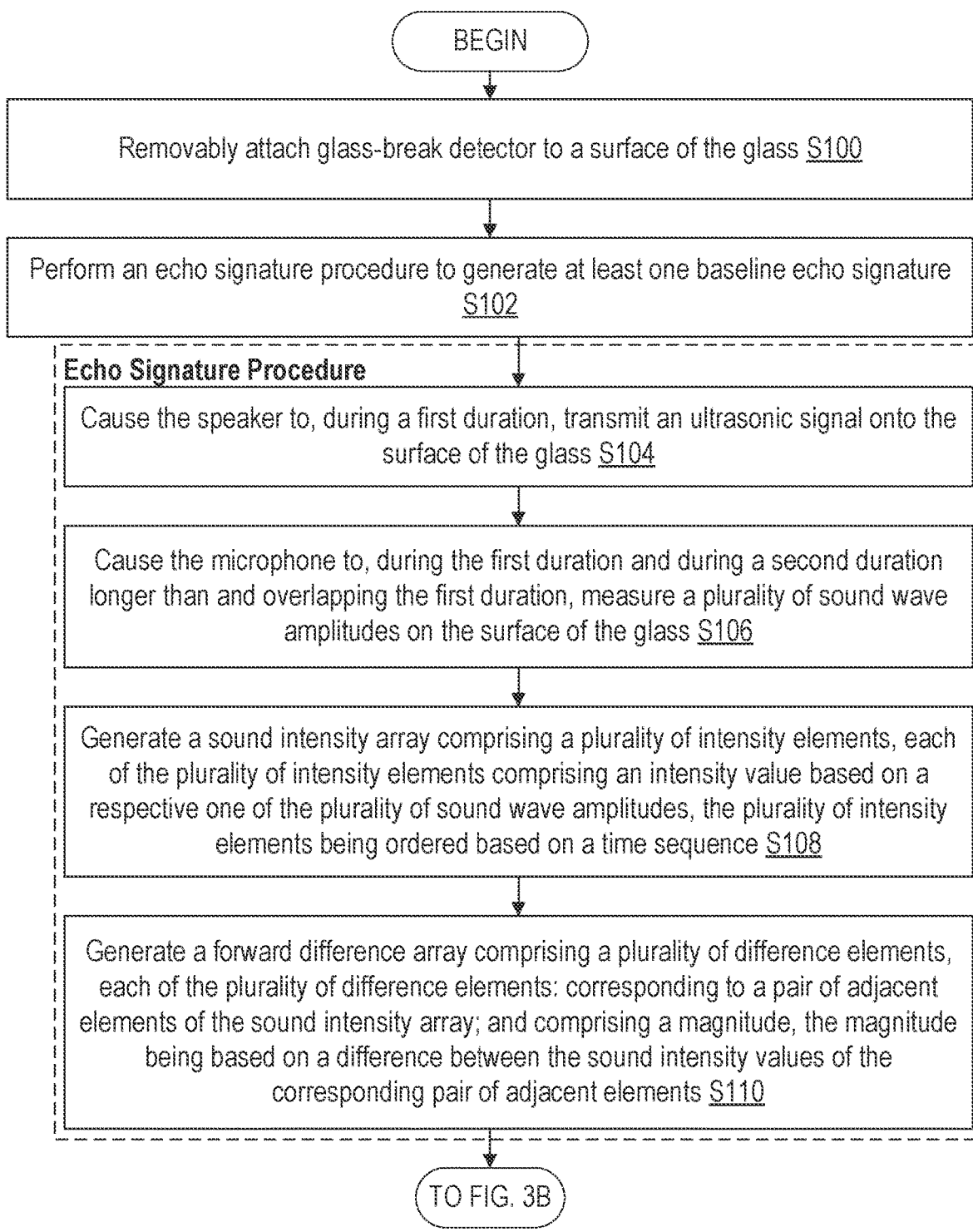
FIGS. 3A and 3B are a flowchart of an example process in a glass-break detector according to some embodiments of the present disclosure.
Figure 3B:
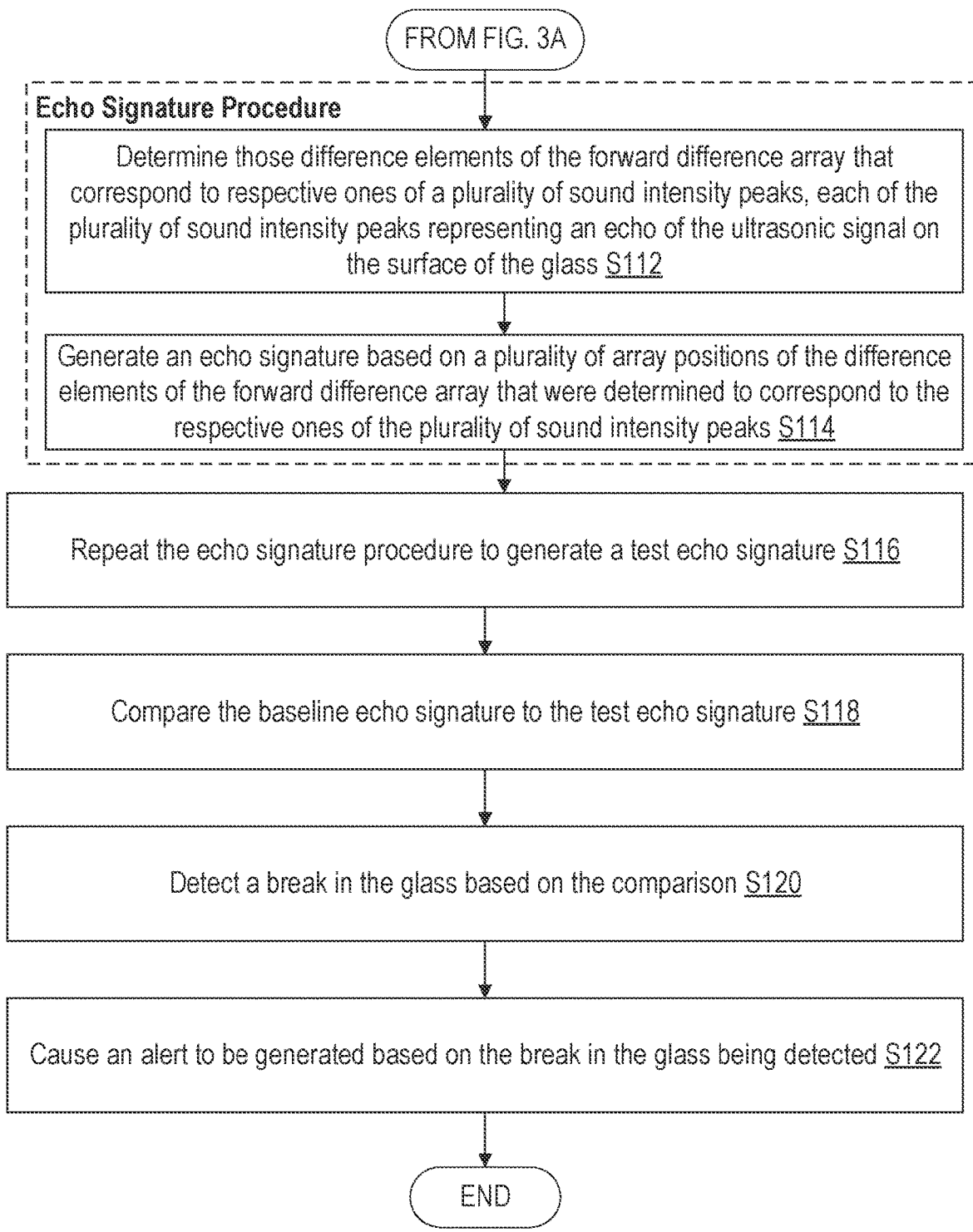

FIGS. 3A-3B are a flowchart of an example process in a glass-break detector 10 according to some embodiments of the present disclosure. One or more blocks described herein may be performed by one or more elements of glass-break detector 10, such as by one or more of processing circuitry 30 (including the detector unit 12), processor 32, and/or communication interface 28.

With respect to FIG. 3A, glass-break detector 10 is removably attached to a surface 20 of the glass 18 (Block S100). It may be attached by any suitable method, including but not limited to suction cups or adhesive. The glass-break detector 10 performs an echo signature procedure to generate a baseline echo signature (Block S102). The echo signature procedure may include one or more of Blocks S104 to S114, which will be discussed in turn. The echo signature procedure may be performed as part of, e.g., a calibration phase lasting for a pre-determined calibration duration such as 10 seconds. The speaker 22, during a first duration (e.g., time duration, time period, time window, etc.), transmits ultrasonic signals onto the surface 20 of the glass 18 (Block S104). In one or more embodiments, the first duration is approximately 75 microseconds. During the first duration, the speaker 22 emits a brief ultrasonic pulse of, e.g., 40,000 Hz for 75 microseconds. The microphone 24, during a second duration (e.g., time duration, time period, time window, etc.) longer than and overlapping the first duration, measures a plurality of sound wave amplitudes on the surface 20 of the glass 18 (Block S106). In one or more embodiments, the second duration may be 900 microseconds.

In one or more embodiments, values such as 900 microseconds for the second duration may be selected based on a presumption that the speed of sound in the glass 18 is approximately 4,540 m/s. For a 2-meter pane of glass 18, a sound wave may need to travel as far as 2 meters to reach an edge of the glass 18, and the reflected wave (i.e., echo) would need to travel 2 meters back to the source (i.e., the glass-break detector 10). Traveling the 4 meters would take approximately 881 microseconds, and therefore 900 microseconds allows sufficient time for the echo to reach the glass-break detector 10. However, in various embodiments, this value may be adjusted to be longer or shorter as may be required for different configurations of glass 18.

In one or more embodiments, values such as 75 microseconds for the first duration may be selected based on a desired number of complete wave cycles to be transmitted as part of the ultrasonic signal. For example, a pulse of 40,000 Hz for 75 microseconds allows three complete wave cycles to be transmitted. The waves generated by the ultrasonic signal radiate out from the speaker 22, pass over the microphone 24, bounce off the sides of the glass 18, and pass back over the microphone 24 again, possibly several times, during the time the microphone 24 is recording (which in one or more embodiments may encompass both the first and second durations).

In one or more embodiments, the microphone 24 measures the sound wave amplitude periodically, such as, e.g., every 7.5 or 12.5 microseconds. The sample rate may vary between embodiments, and some embodiments may use a sampling rate in accordance with Nyquist-Shannon sampling theorem. In an example embodiment, a sampling rate of 7.5 microseconds, a first duration of 75 microseconds, and a second duration of 900 microseconds, the microphone 24 may perform ten measurements during the first duration and 120 measurements during the second duration, for a total of 130 measurements over the 975 total recording time.

Referring back to FIG. 3A, in one or more embodiments, the glass-break detector 10 is configured to generate a sound intensity array comprising a plurality of intensity elements, each of the plurality of intensity elements comprising an intensity value based on a respective one of the plurality of sound wave amplitudes, the plurality of intensity elements being ordered based on a time sequence (Block S108). For example, if 130 measurements are performed, a portion of the sound intensity array (referred to below as "sample")

may be, e.g. (with values given in decibels, though other units may be suitable), where [n] is the position in the sound intensity array:

...
sample[3]=50
sample[4]=75
sample[5]=100
sample[6]=75
sample[7]=50
...

In one or more embodiments, the glass-break detector 10 is configured to generate a forward difference array comprising a plurality of difference elements. In one or more embodiments, each of the plurality of difference elements corresponds to a pair of adjacent elements of the sound intensity array and comprises a magnitude. In one or more embodiments, the magnitude is based on a difference between the sound intensity values of the corresponding pair of adjacent elements (Block S110). Returning to the above example, diff[n]=sample[n]−sample[n−1] (with sample[x]=0 for x a boundary point), and therefore a portion of the forward difference array corresponding to the above portion of the sound intensity array would be (with values given in decibels, though other units may be suitable), where [n] is position in the forward difference array:

...
diff[4]=25
diff[5]=25
diff[6]=−25
diff[7]=−25
...

Referring to FIG. 3B, in one or more embodiments, the glass-break detector 10 is configured to determine those difference elements of the forward difference array that correspond to respective ones of a plurality of sound intensity peaks (Block S112). In one or more embodiments, each of the plurality of sound intensity peaks represents an echo of the ultrasonic signal on the surface 20 of the glass 18. Returning to the example above, the magnitude of the forward difference changes sign (from positive to negative) between position 5 and position 6, indicating that position 5 reflects a peak of the soundwave as measured by the microphone 24. In some embodiments, the glass-break detector 10 may be configured to filter out peaks caused by noise (e.g., caused by sound waves other than those associated with the ultrasonic signal). This may be achieved by disregarding peaks where the magnitude is below a predetermined threshold.

In one or more embodiments, the glass-break detector 10 is configured to generate an echo signature based on array positions of the difference elements of the forward difference array that were determined to correspond to the respective ones of the plurality of sound intensity peaks (Block S114). Returning to the above example, in which the ultrasonic signal comprises three-wave cycles, three peaks in close succession (i.e., with relatively close positions in the array of forward differences) may be observed. The position in the array of the middle of the three peaks may be used to generate the echo signature. Thus, the echo signature may comprise a list of the positions of middle peaks in each set of three sharp peaks.

In one or more embodiments, the glass-break detector 10 is configured to repeat the echo signature procedure (i.e., one or more of Blocks S104 to S114) to generate a test echo signature (Block S116). In some embodiments, a test echo signature may be generated periodically, such as but not limited to every second.

In one or more embodiments, the glass-break detector 10 is configured to compare the baseline echo signature to the test echo signature (Block S118). In one or more embodiments, the glass-break detector 10 is configured to detect the break in the glass based on the comparison (Block S120). In some embodiments, the glass-break detector 10 may generate multiple, e.g., ten, baseline echo signatures. It is possible that there may be slight variations in the positions of the peaks of each baseline echo signature, however, variance should be relatively minimal. In the event of a glass break (e.g., damage such as a crack, fracture, cut, shatter), the positions between the peaks of the baseline echo signature(s) and the test echo signature should vary substantially, i.e., to a degree that is above a predetermined tolerance value. In that event, the glass-break detector 10 may determine that the glass 18 has been broken.

In one or more embodiments, the glass-break detector 10 is configured to cause an alert to be generated based on the break in the glass being detected (Block S122). For example, the glass-break detector 10 may transmit a signal to the premises monitoring system 16, which may generate an alert such as an intruder alarm, siren, lights, or transmitting a message to a user device and/or remote monitoring entity.

In one or more embodiments, the glass-break detector 10 is configured to detect a malfunction of the at least one speaker 22 based on measured sound wave amplitudes and cause a speaker 23 malfunction alert to be generated based on the malfunction being detected. For example, referring to the above example, if an anomaly is detected in the first 75 microseconds, i.e., the first ten samples, this may be due to a problem with the speaker 22.

Figure 4:
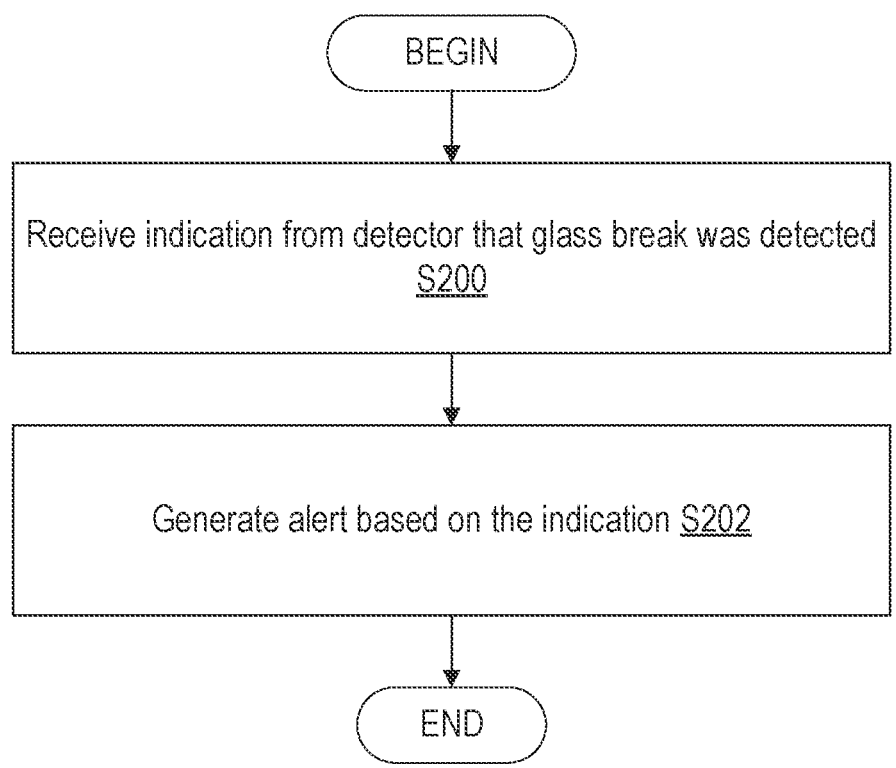
FIG. 4 is a flowchart of an example process in a premises monitoring system according to some embodiments of the present disclosure.

FIG. 4 is a flowchart of an example process in a premises monitoring system 16 according to some embodiments of the present disclosure. Premises monitoring system 16 is configured to receive an indication from glass-break detector 10 that a glass break was detected (Block S200). Premises monitoring system 16 is configured to generate an alert based on and/or in response to the indication (Block S202).

Figure 5:
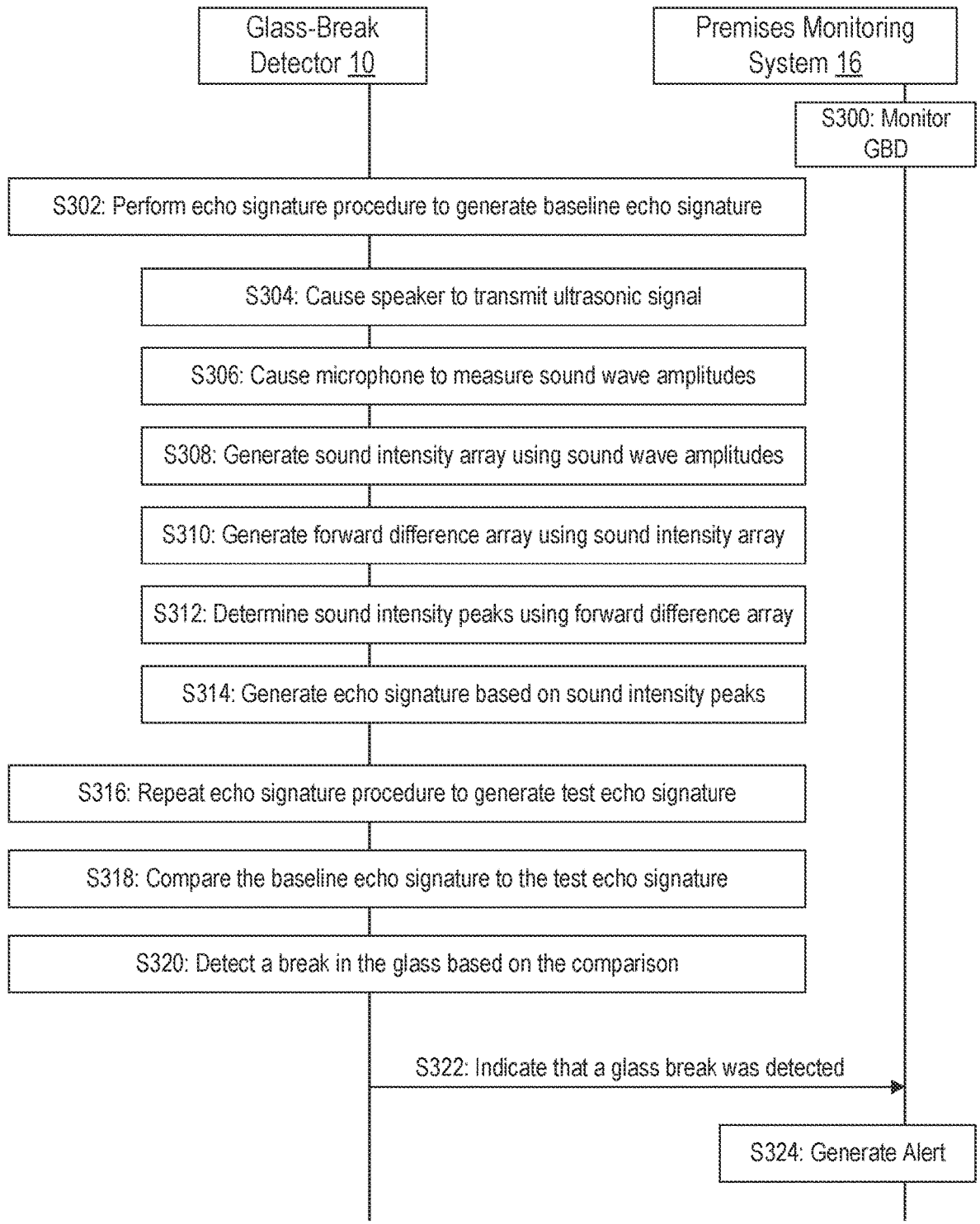
FIG. 5 is a sequence diagram of an example process performed by components of the system of FIGS. 1 and/or FIG. 2 according to some embodiments of the present disclosure.

FIG. 5 is a sequence diagram of an example process according to some embodiments of the present disclosure. Glass-break detector 10 is removably attached to surface 20 of glass 18 for monitoring. At step S300, premises monitoring system 16 monitors glass-break detector 10. For example, premises monitoring system 16 may monitor one or more premises devices (including glass-break detector 10) to determine whether an event occurred at premises 14 and/or whether to generate an alert. At step S302, glass-break detector 10 performs an echo signature procedure to generate a baseline echo signature.

The echo signature procedure comprises one or more of steps S304-S314. At step S304, glass-break detector 10 causes speaker 22 to transmit ultrasonic signal(s). At step S306, glass-break detector 10 causes microphone 24 to measure sound wave amplitudes associated with the ultrasonic signal(s). At step S308, glass-break detector 10 generates a sound intensity array using sound wave amplitudes. At step S310, glass-break detector 10 generates a forward difference array using the sound intensity array. At step S312, glass-break detector 10 determines sound intensity peaks using the forward difference array. At step S314, glass-break detector 10 generates an echo signature based on sound intensity peaks.

After performing the echo signature procedure to generate a baseline echo signature, at step S316, glass-break detector 10 repeats the echo signature procedure (e.g., one or more of steps S304 through S314) to generate a test echo signature. At step S318, glass-break detector 10 compares the baseline echo signature to the test echo signature. At step S320, glass-break detector 10 detects a break in the glass based on the comparison. At step S322, glass-break detector 10 indicates to the premises monitoring system 16 that glass break was detected. At step S324, premises monitoring system 16 generates an alert based on the indication that a glass break was detected, as described herein.

The concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspect. Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions and/or acts specified in the flowchart and/or block diagram block or blocks.

The functions and acts noted in the blocks may occur out of the order noted in the operational illustrations. For example, two blocks shown in succession may in fact be executed substantially concurrently or the blocks may sometimes be executed in the reverse order, depending upon the functionality and/or acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In addition, unless mention was made above to the contrary, the accompanying drawings are not to scale. A variety of modifications and variations are possible in light of the above teachings without departing from the scope and spirit of the present disclosure.

What is claimed is:

1. A detector for detecting a break in a glass, the detector comprising:
 a speaker and a microphone each configured to be disposed in sound communication with a surface of the glass;
 at least one processor; and
 at least one memory storing a plurality of instructions that, when executed by the at least one processor, cause the at least one processor to:
  perform an echo signature procedure to generate a baseline echo signature, the echo signature procedure comprising:
   causing the speaker to, during a first duration, transmit an ultrasonic signal onto the surface of the glass;
   causing the microphone to, during the first duration and during a second duration longer than and overlapping the first duration, measure a plurality of sound wave amplitudes on the surface of the glass;
   generating a sound intensity array comprising a plurality of intensity elements, each of the plurality of intensity elements comprising an intensity value based on a respective one of the plurality of sound wave amplitudes, the plurality of intensity elements being ordered based on a time sequence;
   generating a forward difference array comprising a plurality of difference elements, each of the plurality of difference elements:
    corresponding to a pair of adjacent elements of the sound intensity array; and comprising a magnitude, the magnitude being based on a difference between the intensity values of the corresponding pair of adjacent elements;
determining which difference elements of the forward difference array that correspond to respective ones of a plurality of sound intensity peaks, each of the plurality of sound intensity peaks representing an echo of the ultrasonic signal on the surface of the glass;
generating an echo signature based on a plurality of array positions of the difference elements of the forward difference array that were determined to correspond to the respective ones of the plurality of sound intensity peaks;
repeat the echo signature procedure to generate a test echo signature;
compare the baseline echo signature to the test echo signature;
detect the break in the glass based on the comparison; and
cause an alert to be generated based on the break in the glass being detected.

2. The detector of claim 1, wherein determining which difference elements of the forward difference array that correspond to respective ones of the plurality of sound intensity peaks comprises:
identifying pairs of adjacent difference elements of the forward difference array having opposite signs from one another;
determining whether a difference between the magnitudes of the difference elements of each pair of adjacent difference elements of the forward difference array exceeds a threshold; and
identifying at least one difference element of the pair of adjacent difference elements of the forward difference array that corresponds to a respective sound intensity peak of the plurality of sound intensity peaks based on the difference exceeding the threshold.

3. A detector for detecting a break in a glass, the detector comprising:
at least one speaker and at least one microphone each configured to be disposed in sound communication with a surface of the glass;
at least one processor; and
at least one memory storing a plurality of instructions that, when executed by the at least one processor, cause the at least one processor to:
perform an echo signature procedure to generate a baseline echo signature, the echo signature procedure comprising:
causing the at least one speaker to, during a first duration, transmit an ultrasonic signal onto the surface of the glass;
causing the at least one microphone to, during the first duration and during a second duration, measure a plurality of sound wave amplitudes on the surface of the glass; and
generating an echo signature based on the plurality of sound wave amplitudes;
repeat the echo signature procedure to generate a test echo signature; and
detect a break in the glass based on the baseline echo signature and the test echo signature.

4. The detector of claim 3, wherein the echo signature procedure further comprises:

generating a sound intensity array comprising a plurality of intensity elements, each of the plurality of intensity elements comprising an intensity value based on a respective one of the plurality of sound wave amplitudes, the plurality of intensity elements being ordered based on a time sequence.

5. The detector of claim 4, wherein the echo signature procedure further comprises:
generating a forward difference array comprising a plurality of difference elements, each of the plurality of difference elements:
corresponding to a pair of adjacent elements of the sound intensity array; and
comprising a magnitude, the magnitude being based on a difference between the intensity values of the corresponding pair of adjacent elements.

6. The detector of claim 5, wherein the echo signature procedure further comprises:
determining which difference elements of the forward difference array that correspond to respective ones of a plurality of sound intensity peaks, each of the plurality of the sound intensity peaks representing an echo of the ultrasonic signal on the surface of the glass.

7. The detector of claim 6, wherein the echo signature procedure further comprises:
identifying pairs of adjacent difference elements of the forward difference array having signs opposite one another;
determining whether a difference between the magnitudes of the difference elements of each pair of adjacent difference elements of the forward difference array exceeds a threshold; and
identifying at least one difference element of the pair of adjacent elements of the forward difference array that corresponds to the sound intensity peak of the plurality of sound intensity peaks based on the difference exceeding the threshold.

8. The detector of claim 7, wherein the instructions are further configured to cause the at least one processor to:
compare the baseline echo signature to the test echo signature;
detect the break in the glass based on the comparison, the comparison comprising:
determining that a relative difference in positions between:
the position of the at least one element of the pair of adjacent elements of the forward difference array of the baseline echo signature, and
the position of the at least one element of the pair of adjacent elements of the forward difference array of the test echo signature,
exceeds a tolerance value.

9. The detector of claim 3, wherein the instructions are further configured to cause the at least one processor to:
compare the baseline echo signature to the test echo signature, the detection of the break in the glass being based on the comparison; and
cause an alert to be generated based on the break in the glass being detected.

10. The detector of claim 3, wherein the second duration corresponds to a dimension of the glass.

11. The detector of claim 3, wherein the instructions are further configured to cause the at least one processor to:
detect a malfunction of the at least one speaker based on the plurality of sound wave amplitudes; and
cause a speaker malfunction alert to be generated based on the malfunction being detected.

12. A method implemented in a detector, the method comprising:
- performing an echo signature procedure to generate a baseline echo signature, the echo signature procedure comprising:
  - causing at least one speaker to, during a first duration, transmit an ultrasonic signal onto a surface of a glass;
  - causing at least one microphone to, during the first duration and during a second duration, measure a plurality of sound wave amplitudes on the surface of the glass; and
  - generating an echo signature based on the plurality of sound wave amplitudes;
- repeating the echo signature procedure to generate a test echo signature; and
- detecting a break in the glass based on the baseline echo signature and the test echo signature.

13. The method of claim 12, wherein the echo signature procedure further comprises:
- generating a sound intensity array comprising a plurality of intensity elements, each of the plurality of intensity elements comprising an intensity value based on a respective one of the plurality of sound wave amplitudes, the plurality of intensity elements being ordered based on a time sequence.

14. The method of claim 13, wherein the echo signature procedure further comprises:
- generating a forward difference array comprising a plurality of difference elements, each of the plurality of difference elements:
  - corresponding to a pair of adjacent elements of the sound intensity array; and
  - comprising a magnitude, the magnitude being based on a difference between the intensity values of the corresponding pair of adjacent elements.

15. The method of claim 14, wherein the echo signature procedure further comprises:
- determining which difference elements of the forward difference array that correspond to respective ones of a plurality of sound intensity peaks, each of the plurality of the sound intensity peaks representing an echo of the ultrasonic signal on the surface of the glass.

16. The method of claim 15, wherein the echo signature procedure further comprises:
- identifying pairs of adjacent difference elements of the forward difference array having signs opposite one another;
- determining whether a difference between the magnitudes of the difference elements of each pair of adjacent difference elements of the forward difference array exceeds a threshold; and
- identifying at least one difference element of the pair of adjacent elements of the forward difference array that corresponds to the sound intensity peak of the plurality of sound intensity peaks based on the difference exceeding the threshold.

17. The method of claim 16, further comprising:
- comparing the baseline echo signature to the test echo signature;
- detecting the break in the glass based on the comparison, the comparison comprising:
  - determining that a relative difference in positions between:
    - the position of the at least one element of the pair of adjacent elements of the forward difference array of the at least one baseline echo signature, and
    - the position of the at least one element of the pair of adjacent elements of the forward difference array of the test echo signature,
  - exceeds a tolerance value.

18. The method of claim 12, further comprising:
- comparing the baseline echo signature to the test echo signature, the detection of the break in the glass being based on the comparison; and
- causing an alert to be generated based on the break in the glass being detected.

19. The method of claim 12, wherein the second duration corresponds to a dimension of the glass.

20. The method of claim 12, further comprising:
- detecting a malfunction of the at least one speaker based on the plurality of sound wave amplitudes; and
- causing a speaker malfunction alert to be generated based on the malfunction being detected.

* * * * *